[19] United States Patent
Greene et al.

[11] Patent Number: 4,852,936
[45] Date of Patent: Aug. 1, 1989

[54] VEHICLE BODY AND BODY TO FRAME MOUNTING STRUCTURE

[75] Inventors: Carl B. Greene; Carl B. Greene, III, both of Chickasha, Okla.

[73] Assignee: The New Bus Company, Inc., Plaistow, N.H.

[21] Appl. No.: 186,226

[22] Filed: Apr. 26, 1988

[51] Int. Cl.[4] .............................................. B62D 31/02
[52] U.S. Cl. ................................... 296/178; 296/35.1; 296/104; 296/204
[58] Field of Search ...................... 296/178, 35.1, 104, 296/204

[56] References Cited

U.S. PATENT DOCUMENTS

| 920,594 | 5/1909 | Lillie | 296/178 X |
| 1,464,989 | 8/1923 | Herreshoff | 296/178 |
| 1,508,039 | 9/1924 | Wegner | 296/35.1 X |
| 1,629,133 | 5/1927 | Trout | 296/35.1 X |
| 1,675,074 | 6/1928 | Wiener | 296/178 |
| 2,104,989 | 1/1938 | Hicks | 296/178 |
| 2,163,748 | 6/1939 | Dayes | 296/178 |
| 2,534,501 | 12/1950 | Coleman | 296/178 |
| 3,186,755 | 6/1965 | Ward | 296/178 |
| 3,881,765 | 5/1975 | Cerra et al. | 296/178 |
| 4,203,623 | 5/1980 | Fenner et al. | 296/178 |

FOREIGN PATENT DOCUMENTS

| 2340803 | 2/1975 | Fed. Rep. of Germany | 296/204 |
| 547348 | 8/1956 | Italy | 296/178 |
| 497909 | 12/1938 | United Kingdom | 296/178 |
| 661115 | 11/1951 | United Kingdom | 296/178 |
| 686767 | 1/1953 | United Kingdom | 296/178 |
| 709027 | 5/1954 | United Kingdom | 296/178 |

Primary Examiner—Joseph F. Peters, Jr.
Assistant Examiner—James M. Kannofsky
Attorney, Agent, or Firm—Fleit, Jacobson, Cohn, Price, Holman & Stern

[57] ABSTRACT

A bus body and body-to-chassis frame mounting structure is provided wherein the body is vibration isolation supported from the chassis frame and includes a flooring assembly spaced no more than 3" above the chassis frame, and further wherein the flooring assembly has the lower ends of the legs of top bows of the body anchored relative thereto through the utilization of sill panel structure providing not only an inwardly opening channel for receiving the opposite side marginal edge portions of the flooring assembly, outer side seat mounts and body side reenforcement against lateral impact, but which also facilitates multi-area rigid interconnection between the flooring assembly, the top bows and the outer side panels of the bus body. Further, the mounting structure utilized to mount the bus body from the associated chassis frame accomplishes the mounting function through the utilization of simple conventional body-to-frame mounting structure.

20 Claims, 3 Drawing Sheets 4,852,936

VEHICLE BODY AND BODY TO FRAME MOUNTING STRUCTURE

BACKGROUND OF THE INVENTION

1. Field of the Invention

This invention relates to a vehicle (bus) body side construction as well as the specific structure by which the vehicle body is mounted from the frame of the vehicle through the utilization of vibration isolation dampers while still maintaining the flooring of the body no more than 3" above the vehicle frame.

2. Description of Related Art

Various different forms of bus body constructions and structures for mounting a bus body upon a vehicle frame heretofore have been provided such as those disclosed in U.S. Pat. Nos. 2,104,989; 2,199,886; 2,735,714; 3,186,755; 3,881,765; 4,203,623 and 4,254,987. However, these previously known devices do not inexpensively incorporate a safety sill, seat mounting points, flooring assembly mounting channels and bus body-to-frame mounting structure enabling vibration dampening of the body from the frame while still maintaining the floor assembly at a height no greater than 3" above the frame.

SUMMARY OF THE INVENTION

In order to constuct a federally approved school bus or the like it is necessary to incorporate roll over protection (including the mounting of the bus body flooring at a height no greater than 3" above the frame of the chassis).

Great difficulty has been encountered in this regard if any vibration dampening is to be afforded in the mounting of the bus body from the frame of the chassis. Although various structures heretofor have been provided for vibration dampening mounting of a vehicle body from the frame of the chassis, most forms of inexpensive vibration dampening mounting result in the flooring of the body being spaced greater than 3" above the frame.

In addition, interest has recently increased in providing bus bodies with reenforced sides and with more secure mounting of the side wall construction and the flooring assembly relative to the lower ends of the top bows of the bus body.

The main object of this invention is to provide a combined reinforced bus flooring assembly of low vertical height and vibration dampening mounting structure for the flooring assembly such that it may be mounted from the frame rails of a vehicle chassis with the flooring assembly no more than 3" above the frame rails.

Another object of this invention, in accordance with the immediately preceding object, is to provide a side sill assembly for use in mounting the sides and the top of a bus body from the floor assembly in a manner complimenting the structure of the floor assembly and providing a strong interconnection between not only the body sides and the flooring but also the top bows and the flooring.

Another very important object of this invention is to provide a bus side sill construction in accordance with the preceding objects and wherein the sill construction also functions as outboard mounts for interior seats within the bus body.

Another object of this invention is to provide a bus body side construction incorporating a longitudinal sill which offers considerable protection against lateral impact upon the bus body.

A final object of this invention to be specifically enumerated herein is to provide an apparatus in accordance with the preceding objects and which will conform to conventional forms of manufacture, be of simple construction and easy to assemble so as to provide a device that will be economically feasible, long lasting and relatively trouble free in assembly.

These, together with other objects and advantages which will become subsequently apparent reside in the details of construction and operation as more fully hereinafter described and claimed, references being had to the accompanying drawings forming a part hereof, wherein like numerals refer to like parts throughout.

BRIEF DESCRIPTION OF THE DRAWINGS

FIG. 2 is a fragmentary enlarged transverse vertical sectional view illustrating the construction and assembly of component parts of the left side of the bus body as well as the manner in which the left side of the bus body is mounted to the left longitudinal frame rail of the chassis;

FIG. 3 is an enlarged framentary horizontal sectional view taken substantially upon the plane indicated by the section line 3—3 of FIG. 2;

FIG. 7 is a fragmentary perspective view illustrating the manner in which the bus body flooring assembly is mounted to an underlying chassis frame member, parts of the flooring assembly and frame member being broken away and illustrated in vertical section.

DESCRIPTION OF THE PREFERRED EMBODIMENT

Figure 1:
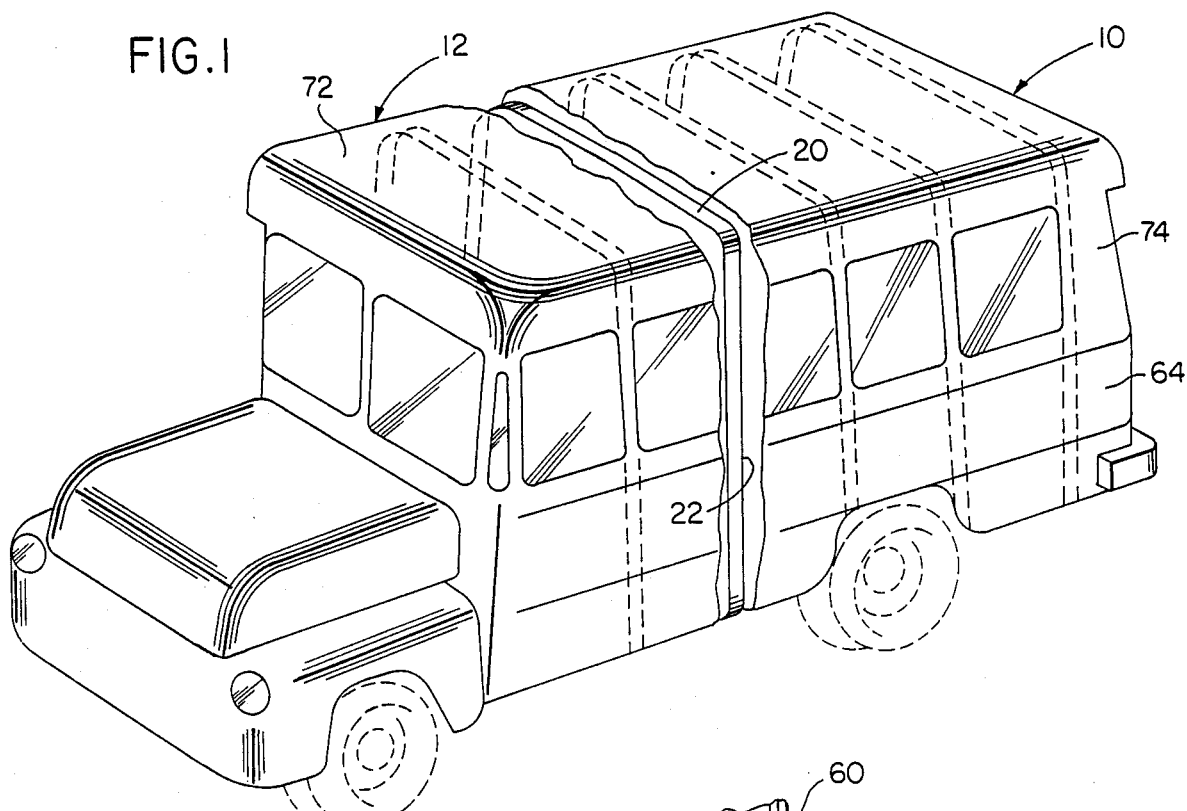
FIG. 1 is a perspective view of a typical school bus body with an intermediate portion thereof being broken away in order to illustrate the side reenforcing and top supporting bows of the bus body.

Referring now more specifically to the drawings, the numeral 10 generally designates a school bus including a body construction referred to in general by the reference numeral 12 and a chassis frame referred to in general by the reference numeral 14 and including a pair of opposite side longitudinal frame members 16, see FIG. 2.

The body construction 12 includes a flooring assembly referred to in general by the reference numeral 18 and a plurality of longitudinally spaced transversely extending channel shaped bows 20 each including a pair of depending legs 22 extending downward through notched side marginal portions of the flooring assembly 18. The flooring assembly 18 includes a plurality of elongated, transversely extending and longitudinally spaced sub-flooring sections 24, each section 24 including 3 integral sub-flooring panel sections 26 disposed in side-by-side relation and having adjacent longitudinal marginal portions interconnected by reversely bent integral depending ribs 28, see FIGS. 5, 6 and 7.

Figure 5:
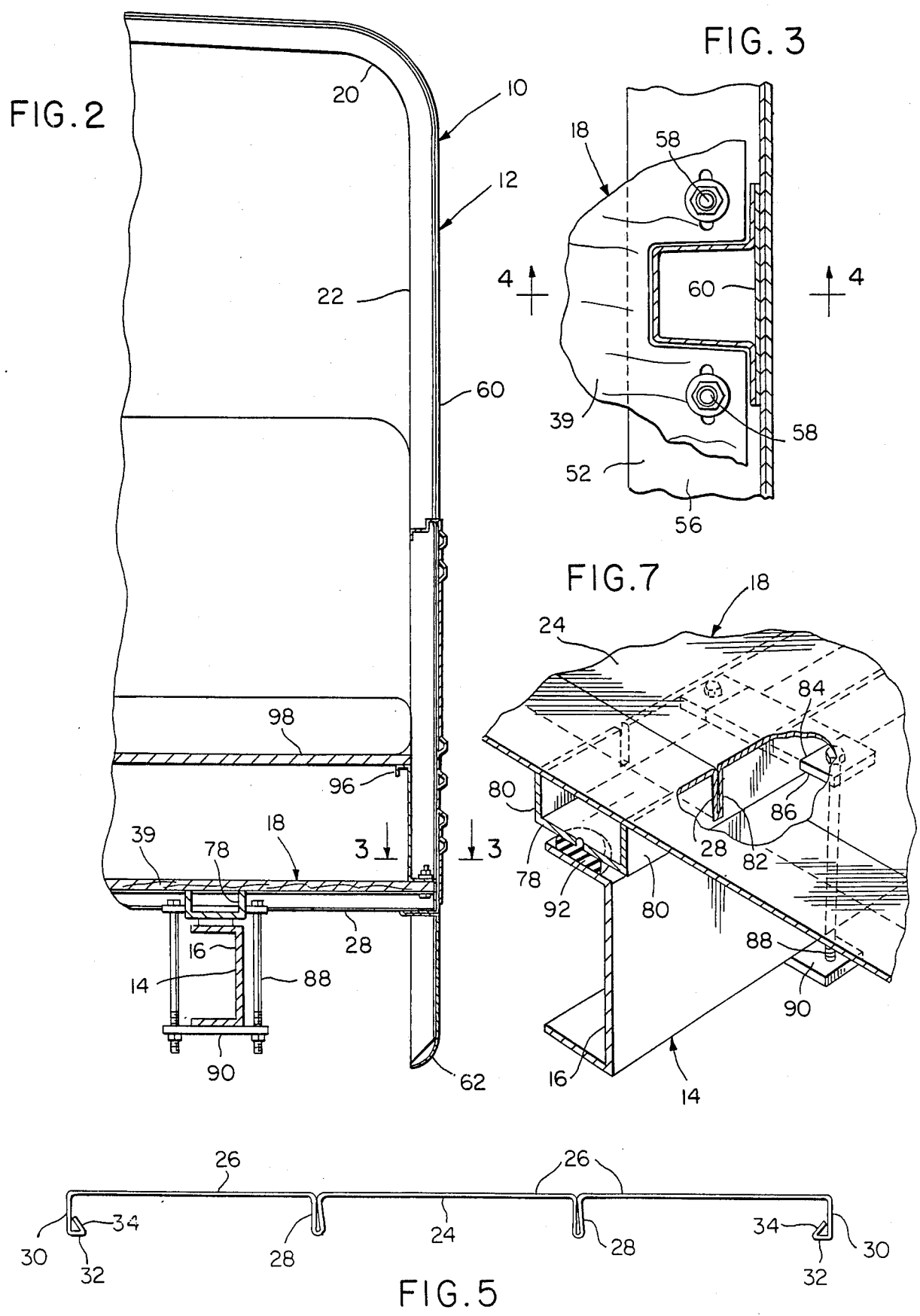
FIG. 5 is an end elevational view of one of the transversely extending sub-flooring sections of the bus body construction.
Figure 6:
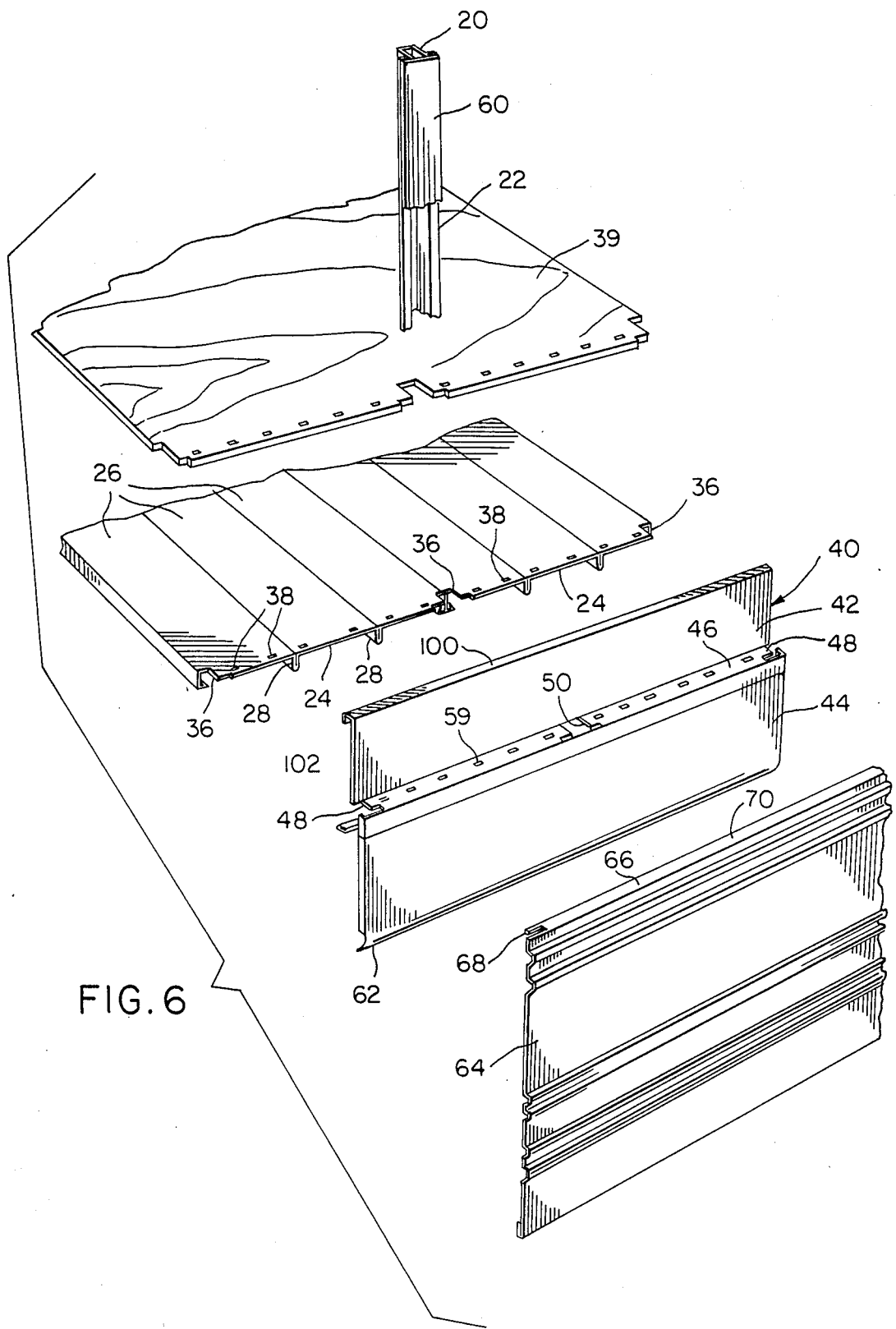
FIG. 6 is a fragmentary exploded perspective view illustrating those components of the invention illustrated in FIG. 6.

Opposing longitudinal marginal portions of the sub-flooring sections 24 include depending flanges 30 terminating downwardly in horizontally inwardly directed flanges 32 terminating inwardly in upwardly and outwardly inclined flanges 34, see FIG. 5. The ribs 28 and flanges 30 are substantially 2 inches in height. Abutted adjacent flanges 30 may be secured together in any convenient manner such as intermittant welding beads extending therealong (both top and bottom) and the upper portions of the ribs 28 also may be secured together by intermittant welding beads.

Adjacent end margins of the sub-flooring sections 24 are notched as at 36 to receive the lower ends of the corresponding legs 22 of the bows 20 therethrough and are also apertured as at 38. Further, similarly notched and apertured ply wood or other material flooring panels 39 overlie the sub-flooring sections 24.

A heavy gauge sheet material sill panel referred to in general by the reference numeral 40 is provided and includes upper and lower sections 42 and 44. The upper and lower sections are integrally connected by a horizontally inwardly projecting flange 46 integral with the upper margin of the lower section and the lower margin of the upper section and the flange 46 is notched as at 48 on its opposite ends and has a central opening 50 formed therethrough for receiving the corresponding legs 22 of the associated bows 20 therethrough. The lower section 44, below the flange 46, includes an inwardly projecting reversely bent double thickness flange 52 and the space defined between the flange 46 and the flange 52 defines an inwardly opening horizontal channel 56 in which the corresponding marginal edge of the flooring assembly 18 including the sub-flooring sections 24 and the flooring panels 40 is received, threaded fasteners 58 being secured through apertures 59 formed in the flange 46 alligned with the apertures 38 and corresponding apertures in the flooring panels 39 for rigidly securing the longitudinal marginal edge portions of the flooring assembly 18 within the channels 56 and to the legs 22 of the bows 20, the upper section 42 being secured to the inner sides of the corresponding bow legs 22 in any convenient manner. Further, the outer sides of the bows 20 are closed by a sheet metal cap 60 secured thereover.

The lower marginal edge of the lower section 44 curves inwardly as at 62 under the lower ends of the corresponding legs 22 and a heavy gauge sheet material outer side wall panel 64 is secured over the sill panel 40 in any convenient manner, the outer side wall 64 terminating downwardly a space distance above the double thickness flange 52 and extending upward to a point space considerably above the upper extremity of the upper section 42 of the sill panel 40, the upper marginal edge of the outer side wall 64 including an inwardly directed horizontal flange 66 notched at its opposite ends as at 68 and provided with openings 70 therethrough for receiving the legs 22 of the bows 20 therethrough. The outer side wall panels 64 comprise lower outer side wall panels and the top of the body construction 12 is covered by top outer wall panels 72 and the upper portions of the sides of the body construction 12 are covered by upper outer side wall panels 74, the lower marginal edges of the side wall panels 74 downwardly overlapping the upper marginal edges of the outer side wall 64.

Extending longitudinally of the flooring assembly 18 are a pair of upwardly opening channel members 78 each directly overlying a corresponding longitudinal frame member 16 and the channel members 78 include opposite side upstanding flanges 80 having transversely registered upwardly opening notches 82 formed therein in which the ribs 28 are received and secured in any convenient manner such as by welding. Longitudinally spaced portions of each channel member 78 have transversely registered windows 84 formed through the lower marginal portions of the flanges 80 thereof and elongated anchoring bars 86 extend through and beyond each pair of registered windows 84 and have the upper ends of threaded bolts 88 secured therethrough, the lower ends of the bolts 80 being secured through the opposite ends of corresponding anchor bars 90 extending transversely of and disposed beneath the corresponding longitudinal frame member 16.

In addition, a plurality of resilient discs 92 are disposed between and spaced along the channel members 78 and frame members 16, whereby the entire body 10 is supported from the frame 14 in a manner isolating the body construction 12 from vibration of the chassis frame 14.

Figure 4:
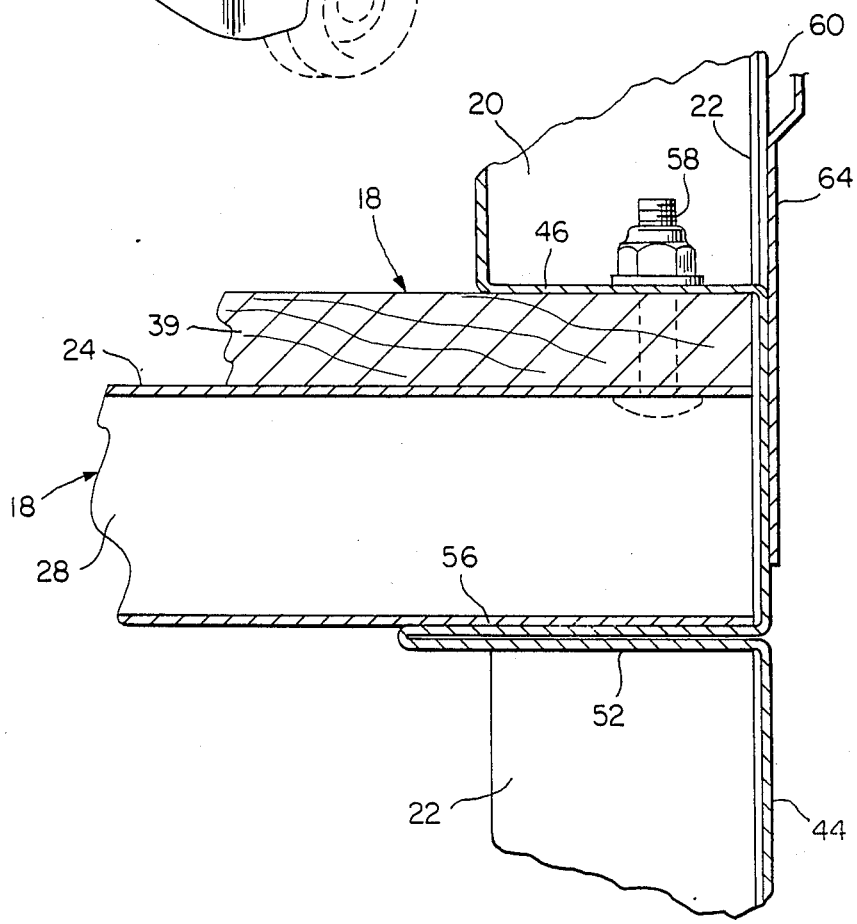
FIG. 4 is an enlarged framentary vertical sectional view taken substantially upon the plane indicated by the section line 4—4 of FIG. 3.

With attention invited more specifically to FIGS. 2 and 4 of the drawings, it may be seen that the ribs 28 of the sub-flooring sections 24 are received and secured in the notches 82 and that the ribs 28 thereby function to completely fill the notches 82. Accordingly, rigidity of the longitudinal stiffening members comprising the channel members 78 is not destroyed (but in fact increased) by the notches 82 and the transverse stiffening of the sub-flooring by the ribs 28 is maintained, even though the undersides of the channel members 78 are only approximately 2" beneath the horizontal portions of the sub-flooring section 24. Thus, the one inch high resilient discs 92 provide ample vibration isolation between the chassis frame 14 and the body construction 12 while maintaining the horizontal portions of the panel sections 26 no more than 3" above the longitudinal frame members 16. In addition, the sill panel 40 provides not only the channel 56 for snuggly receiving the corresponding marginal edge of the flooring assembly 18 therein, but also more rigidly anchors the floor assembly 18 relative to the legs 22 of the bows 20 and further provides strengthening of the side wall of the body construction 12 against lateral impact. Also, the sill panel 40 further provides an outer side mount as at 96 for the seats 98 within the body construction 12, see FIG. 2. The outer side mount as at 96 is defined by an inwardly directed upper flange 100 carried by the upper marginal portion of the sill panel 40, the flange 100 terminating inwardly in a short downturned vertical flange 102 for additional strength.

The foregoing is considered as illustrative only of the principles of the invention. Further, since numerous modifications and changes will readily occur to those skilled in the art, it is not desired to limit the invention to the exact construction and operation as shown and described, and accordingly, all suitable modifications and equivalents may be resorted to, falling within the scope of the invention.

What is claimed as new is as follows:

1. A vehicle body and frame combination including a vehicle frame having opposite side longitudinal frame members, a body including a flooring assembly incorporating a plurality of depending transversely extending and longitudinally spaced stiffening ribs, a pair of upwardly opening opposite side channel members disposed beneath said flooring assembly and including upstanding opposite side flanges interconnected by a web extending therebetween, said channel members overlying said frame members and extending longitudinally therealong, mounting means anchoring said channel members to said frame members at points spaced longitudinally therealong, said flanges including longitudinally spaced upwardly opening narrow transverse slots formed therein downwardly into which said stiffening ribs project and in which said ribs are secured.

2. The combination of claim 1 wherein said slots extend downwardly to said web and are substantially the same vertical extent as said ribs.

3. The combination of claim 1 wherein said channel members, intermediate pairs of adjacent ribs, include longitudinally spaced pairs of transversely registered transverse window openings formed therethrough, and an elongated horizontal transverse mounting bar extending through and beyond each pair registered window openings, said mounting means including opposite side segments thereof disposed on oppposite sides of each of said channel members and extending between and anchored to the opposite ends of said bars and opposite sides of the corresponding frame member.

4. The combination of claim 3 wherein each of said opposite side segments includes a threaded tension member.

5. The combination of claim 3 including a plurality of resiliant vibration transmission dampener bodies interposed between each channel member and the corresponding frame member and spaced longitudinally therealong.

6. A vehicle body construction including an elongated flooring assembly, a plurality of inverted U-shaped bows spaced along, extending transversely of said flooring assembly and including opposite side legs having lower end portions embracingly receiving opposite side longitudinal margins of said flooring assembly therebetween with lower terminal ends of said legs projecting downwardly below said flooring assembly, a longitudinally extending and edge upstanding heavy gauge sheet material sill panel overlying the outer sides of each set of corresponding legs of said bows, said sill panels each including an integral lower horizontally inwardly projecting and reversely bent double thickness shelf extending longitudinally therealong downwardly through which the lower end portions of the corresponding legs extend and an integral inwardly directed horizontal flange spaced above said shelf downwardly through which the lower end portions of said legs also extend, said flanges each terminating inwardly in an upwardly directed upper marginal portion of the corresponding sill panel extending upwardly along the inner sides of the corresponding legs of said bows, said sill panels each, between the horizontal flange and said shelf, defining a longitudinally extending and horizontally inwardly opening channel in which the corresponding longitudinal margin of said flooring assembly is embracingly received, said longitudinal margins of said flooring assembly being secured within said horizontally inwardly opening channels, and outer side wall panel portions secured over the outer surfaces of said bows and said sill panels.

7. The body construction of claim 6 wherein said flooring assembly includes a heavy gauge sheet material sub-flooring incorporating longitudinally spaced and transversely extending depending stiffening ribs whose opposite ends are received in said inwardly opening channels.

8. The body construction of claim 7 wherein said flooring assembly includes flooring panel means overlying said sub-flooring and including opposite side longitudinal margins received in said inwardly opening channels.

9. The body construction of claim 7 wherein said ribs comprise integral reversely bent downwardly projecting portions of said sheet material sub-flooring.

10. The body construction of claim 9 wherein said flooring assembly includes flooring panel means overlying said sub-flooring and including opposite side longitudinal margins received in said inwardly opening channels.

11. The body construction of claim 6 including a vehicle frame incorporating opposite side longitudinal frame members, said flooring assembly incorporating a plurality of depending transversely extending and longitudinally spaced stiffening ribs, a pair of upwardly opening opposite channel members disposed beneath said flooring assembly and including upstanding opposite side flanges interconnected by a web extending therebetween, said channel members overlying said frame members and extending longitudinally therealong, mounting means anchoring said channel members to said frame members at points spaced longitudinally therealong, said flanges including longitudinally spaced upwardly opening narrow transverse slots formed therein downwardly into which said stiffening ribs project and in which said stiffening ribs are secured.

12. The vehicle body and frame combination of claim 11 wherein said slots extend downwardly to said web and are substantially the same vertical extent as said ribs.

13. The combination of claim 11 wherein said channel members, intermediate pairs of adjacent ribs, include longitudinally spaced pairs of transversely registered transverse window openings formed therethrough, an elongated horizontal transverse mounting bar extending through and beyond each pair registered window openings, said mounting means including opposite side segments thereof disposed on oppposite sides of each of said channel members extending between and anchored to the opposite ends of said bars and opposite sides of the corresponding frame member.

14. The combination of claim 13 wherein each of said opposite side segments includes a threaded tension member.

15. The combination of claim 13 including a plurality of resiliant vibration transmission dampener bodies interposed between each channel member and the corresponding frame member and spaced longitudinally therealong.

16. The combination of claim 15 wherein said flooring assembly includes a heavy gauge sheet metal sub-flooring including longitudinally spaced and transversely extending depending stiffening ribs, the opposite ends of said stiffening ribs being received in said inwardly opening channels.

17. The combination of claim 16 wherein said flooring assembly includes flooring panel means overlying said sub-flooring and including opposite side longitudinal margins received in said inwardly opening channels.

18. The combination of claim 16 wherein said ribs comprise integral reversely bent downwardly projecting portions of said sheet material sub-flooring.

19. The combination of claim 18 wherein said flooring assembly includes flooring panel means overlying said sub-flooring and including opposite side longitudinal margins received in said inwardly opening channels.

20. The combination of claim 19 wherein said flooring assembly opposite side longitudinal margins have outwardly opening notches formed therein in which the legs of said bows are recessed.

* * * * *